United States Patent

[11] 3,609,153

| [72] | Inventors | Fred D. Cook<br>Edmonton, Alberta;<br>Oliver E. Edwards, Ottawa, Ontario;<br>Douglas C. Gillespie, Ottawa, Ontario;<br>Edwin R. Peterson, Ottawa, Ontario, all of Canada |
|---|---|---|
| [21] | Appl. No. | 632,455 |
| [22] | Filed | Apr. 20, 1967 |
| [45] | Patented | Sept. 28, 1971 |
| [73] | Assignee | Canadian Patents and Development Limited<br>Ottawa, Ontario, Canada |
| [32] | Priority | Mar. 30, 1966, Apr. 30, 1968 |
| [33] | | Canada |
| [31] | | 956,685 and 784,213 |
| | | Continuation-in-part of application Ser. No. 538,639, Mar. 30, 1966, now abandoned. |

[54] 1 HYDROXY 6 METHOXY PHENAZINES
4 Claims, 3 Drawing Figs.

| [52] | U.S. Cl. | 260/267,<br>195/80, 260/502 R, 424/250 |
|---|---|---|
| [51] | Int. Cl. | C07d 51/80 |
| [50] | Field of Search | 260/267 |

[56] References Cited
UNITED STATES PATENTS

| 3,502,773 | 3/1970 | Grunburg | 424/250 |
|---|---|---|---|
| 3,502,774 | 3/1970 | Grunberg | 424/250 |
| 3,530,130 | 9/1970 | Leimgruber | 260/267 |
| 2,921,937 | 1/1960 | Gordon et al. | 260/267 |
| 2,986,493 | 5/1961 | Overeem | 260/267 X |
| 3,236,850 | 2/1966 | Oswald | 260/267 X |

FOREIGN PATENTS

| 1,098,209 | 1/1968 | Great Britain | 260/267 |
|---|---|---|---|

OTHER REFERENCES

Edwards et al. Tetra Hedron Letters No. 40, p. 4867– 4870 (1966) Washington Post, pH1, April 28, 1966

Primary Examiner—Donald G. Daus
Attorney—Fidelman, Wolffe & Leitner

ABSTRACT: Unsymmetrical 1-hydroxy-6-substituted phenazines and their N-oxides have been prepared from 1,6-disubstituted phenazines by forming the 1-hydroxy compound and oxidizing to form the 10-oxide and the 5,10-dioxide. The substituent in the 6 position is preferably lower alkoxy but may also be lower alkyl. The 1-hydroxy-6-substituted-5,10-dioxide compounds are antibiotics useful inter alia in agriculture. Myxin is the name given to the microbiologically produced compound, employing strains CBRI 903 and 904, type 3C Sorangium.

VISIBLE ABSORPTION SPECTRA (40 μg/ml.)

VISIBLE ABSORPTION SPECTRA (40 μg/ml.)

UV ABSORPTION SPECTRA (2 μg./ml.)

1 HYDROXY 6 METHOXY PHENAZINES

This application is a continuation-in-part of Cook et al. Ser. No. 538,639, filed Mar. 30, 1966, now abandoned.

This invention is directed to a new antibiotic (designated Myxin), to its production by fermentation, and by synthesis and to methods for its recovery, concentration and purification.

The invention further includes novel unsymmetrical phenazine compounds of the formula:

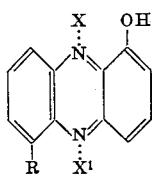

where X when present is the monoxide, $X^1$ is the monoxide and is present only when X is the monoxide, and R is selected from lower alkoxy, and lower alkyl groups. Specific compounds of the invention include 1-hydroxy- 6-methoxyphenazine, 1-hydroxy- 6-methoxyphenazine- 10-oxide, and 1-hydroxy- 6-methoxyphenazine- 5, 10-dioxide.

Included within the scope of the invention are diluted forms of the antibiotic Myxin, crude concentrates thereof and pure crystalline forms. A soil-borne myxobacter, identified as a species of Sorangium has been found to produce the antibiotic, which is capable of inhibiting the growth of a wide variety of micro-organisms including gram-positive and gram-negative bacteria, fungi, actinomycetes and yeasts. The antibiotic is of the phenazine type and its activity, structure and chemical and physical properties differentiate it from previously described antibiotics. The name Myxin is used hereinafter for the antibiotic.

Myxin is readily isolated from culture fluids of the organism e.g. by extraction, or absorption on an ion exchange resin. The substantially pure material has been obtained by chromatographic treatment of the concentrates. The antibiotic is a red pigmentlike material crystallizing in small dark red needles or prisms. It decomposes into an orange pigment having the formula 1-hydroxy- 6-methoxy-phenazine- 10-oxide, which is devoid of antibiotic activity. On extended incubation of the organism a purple pigment is produced. Both orange and purple pigments show no significant antibiotic activity.

Certain soil-borne myxobacters were known to produce antibiotic substances having narrow antimicrobial spectra e.g. inhibit gram-positive but not gram-negative eubacteria. Two specific strains of Myxococcus fulvus were found active against both gram-positive and gram-negative bacteria but no evidence of activity against various fungi and yeasts was obtained. In all studies reported, the previous antibiotic substances were found to be highly unstable. Certain antibiotics containing the phenazine ring structure are known e.g. pyocyanine, iodinin, griseolutein and chloraphin. The antibiotic of the present invention is readily distinguished from these compounds by structure and properties. In the attached drawings:

Figure 1:
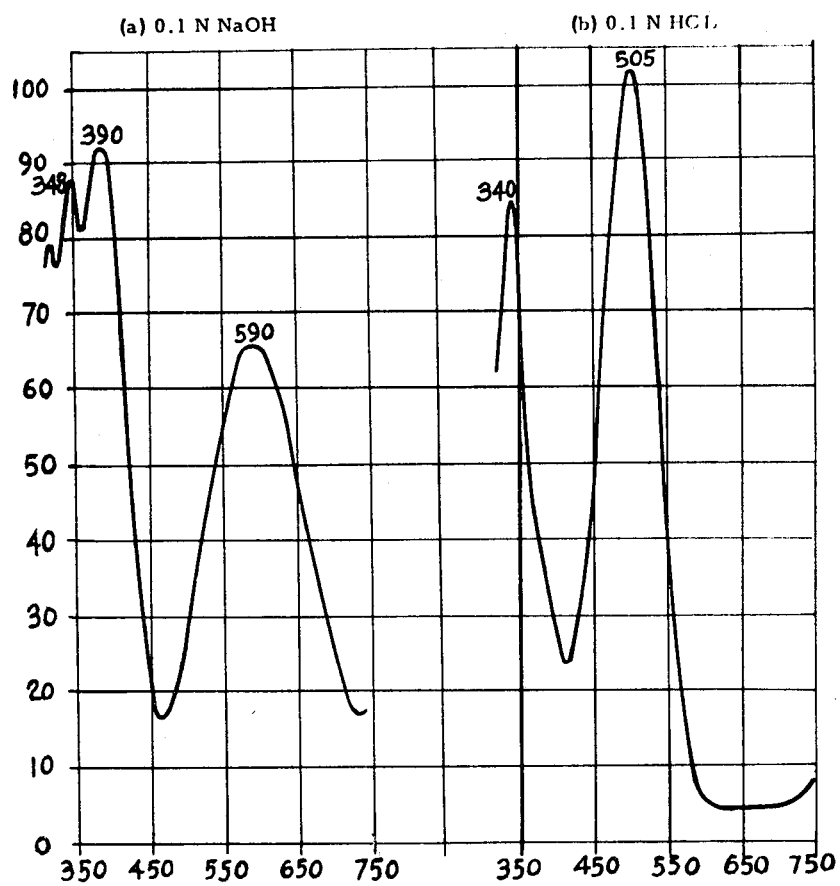
FIG. 1 is a graph of the absorption spectra in the visible region for the red antibiotic in (a) 0.1N NaOH and (b) 0.1N HCl.

The species of Sorangium (designated strain 3C), which produces the antibiotic capable of inhibiting a wide range of micro-organisms, was isolated from soil at the Central Experimental Farm, Ottawa, Canada. The species fits the general description of Myxobacterales (see for instance Bergey's Manual of Determinative Bacteriology—7th Ed. Williams and Wilkins, Baltimore 1957 pages 854 and 855 ) of the family Sorangiaceae (ibid. pages 866+). The vegetative cells are flexible rods of low refractility, which exhibit gliding movement on solid surfaces, and which multiply by binary transverse fission to produce a thin flat rapidly extending colony. Actively motile cells at the periphery of the colony commonly occur as groups of two or three to several hundred individuals in the form of tonguelike extensions or isolated islands. The cells are not surrounded by a demonstrable wall and are flexible and very weakly refractile. No extracellular enzymes are evident. The colony consists characteristically of a flat thin mass of vegetative cells which spreads rapidly over the surface of the substrate as a result of active movement from the periphery. "Fruiting bodies" having the shape of polygons are occasionally observed on solid medium. Strain 3C does not appear to fit any of the previously described species of Sorangium. Other species have been investigated but none produced an antibiotic of activity approaching that of strains of the type 3C. Various strains of this species which produce Myxin are being maintained at the Microbiology Research Institute, Canada Department of Agriculture, Ottawa, Canada. However, other suitable strains or mutants may be found or produced e.g. by irradiation.

The strain 3C may be grown in any suitable medium containing assimilable sources of carbon, nitrogen and inorganic salts.

Suitable media which have been used include a. yeast - soil extract medium containing 0.1 percent glucose, b. mixture of tryptone (partial digest of protein) 0.1 percent, glucose 0.1 percent and tap water, and c. either of the above media in distilled water to which the following salts were added per litre: 1g. $K_2HPO_4$, 0.2g. $MqSO_4$, 0.1g. $CaCl_2$ and 0.01g. $FeCl_3$.

The pH of the medium is desirably about 7 to 7.5. The amount of inoculum is suitably about 1 to 4 percent vol. e.g. of a 24-hour shake culture. Aeration is carried out by shaking in flasks or by aerating fermentors desirably with about 1 to 4 litres of air per min. per 10 litres medium. After incubating for about 12 to 26 hours at about 24° to 30° C., the Myxin is harvested. The culture appears a turbid red mixture before harvesting.

Myxin may be recovered by various extraction, concentration and purification steps. Three steps found desirable for separation are (a) acidification to pH about 1 to 1.5 and extraction with ether, (b) extraction with chloroform, and (c) removal of cells by centrifugation and adsorption on a cation exchange resin. These steps may be used together to effect increased separation and concentration. One harvesting and purification procedure carried out is as follows. The culture medium is centrifuged and the cells discarded. The supernatant is percolated directly through a resin bed (carboxylic-type cation exchanger) and the bed washed with distilled water. The pH is raised to 7.7 to 7.9 (with 1N $NH_4OH$) and a large amount of an orange-colored impurity is separated (by filtering and washing the resin). On raising the pH to 9.3 to 9.5 the antibiotic can be readily eluted from the resin. The eluates are then adjusted to pH 1 to 1.5 (with HCl) and extracted with ether—further orange contaminant remaining in the aqueous phase. The extract is then dried giving a deep cherry red residue. For further purification the residue may be dissolved in acetone and chromatographed on cellulose paper or powder with methanol as the developing solvent.

A second recovery and purification procedure carried out is to extract the pigment from the culture with successive volumes of chloroform until the red color is removed from the culture. The chloroform phase is then washed thoroughly with distilled water and evaporated in vacuo. The residue is dissolved in acetone and chromatographed e.g. on cellulose. The red zone is the antibiotic and is isolated and recrystallized from acetone. The orange contaminant or degradation product is more heat stable than Myxin, is more readily crystallized, and has a characteristic melting point of 227° to 229° C.

FIG. 1 shows the visible absorption spectra of the Myxin in (a) 0.1N NaOH showing peaks at 348, 390 and 590 m μ and in (b) 0.1N HCl showing peaks at 340 and 505 m μ (solution concentrations 40 μg./ml.).

Figure 2:
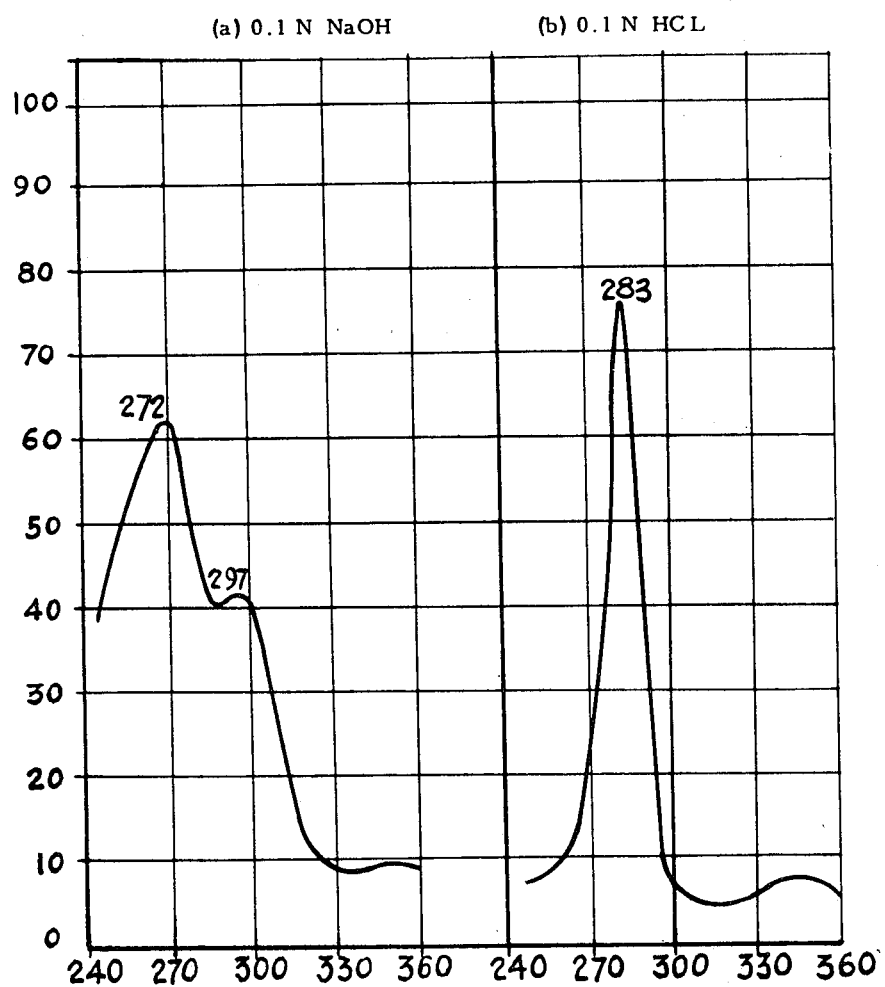
FIG. 2 is a graph of the absorption spectra in the ultraviolet region for the antibiotic in (a) 0.1N NaOH and (b) 0.1N HCl.
Figure 3:
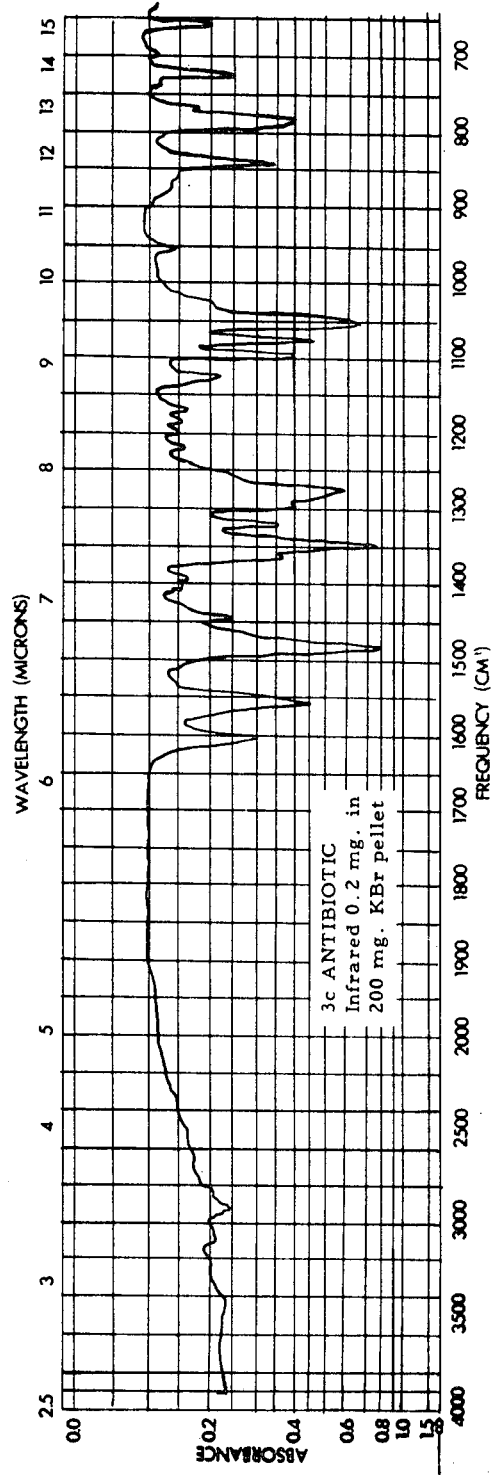
FIG. 3 is a graph of the infrared absorption spectra of the antibiotic.

The antibiotic UV absorption spectra in FIG. 2 shows a peak at 272 millimicrons (shoulder at 297) in 0.1N NaOH and a peak at 283 in 0.1N HCl (solution concentrations 2 μg./ml.). The infrared absorption spectra of the antibiotic shown in FIG. 3 was prepared in a standard manner by mixing with KBr crystals and pressing into a pellet (0.2 mg. in 200 mg. KBr pellet). The antibiotic compound exhibits characteristic absorption at the following wavelengths expressed in microns 3.44, 6.25, 6.42, 6.74, 6.93, 7.12, 7.22, (shoulder 7.34), 7.44, 7.59, (shoulder 7.75), 7.86, 8.24, 8.37, 8.48, 8.60, 8.91, 9.17, 9.31, 9.50 (shoulder 9.73), 10.51, 11.93, 12.84, 13.18, 13.92, 14.50, and 15.31. The above spectral data was obtained from material chromatographically pure and crystallized three times from acetone.

Myxin crystallizes as small dark red needles, which tend to form aggregates in which smaller crystals are embedded in the main needlelike crystals. It is slightly soluble in water, carbon tetrachloride and petroleum ether, but is more readily soluble in methanol, acetone, ether, chloroform and toluene. On heating, the antibiotic compound decomposes in air at 120°–130° C. into an orange pigment of melting point about 227° C.

Elemental analysis of the orange pigment reveals carbon 64.95 percent hydrogen 4.16 percent, nitrogen 10.96 percent and oxygen 19.93 percent. The empirical formula is $C_{13}H_{10}N_2O_3$ and the observed molecular weight is 246 (determined by vapor pressure osmometry). These and other data including degradation and synthesis studies confirm the structure of the orange pigment as 1-hydroxy- 6-methoxy-phenazine-10-oxide. This orange pigment has no antibiotic activity (as determined by tests similar to those outlined below for Myxin). A purple pigment (also devoid of antibiotic (myxinlike) activity) is produced by the Sorangium 3C on extended incubation. No synergism or antagonism in antibiotic activity has been observed with various combinations of the orange, red and purple pigments.

The antibiotic showed progressively increased stability from the culture filtrate to the chromatographically pure form. Solutions in acetone or methanol showed high stability at 4° C., even in a relatively impure state. Phosphate buffer catalyzed the breakdown of even the purest preparations, whereas the latter remained stable indefinitely at 4° C. in organic solvents or in tris (tri (hydroxymethyl) aminomethane-HCl buffer. Tests at 37° C. for 6 hours showed no loss of activity of the antibiotic dissolved in water, in 0.05N acetate buffer at pH 5.0, 0.05N phosphate at pH 6.0 and 7.0, or in 0.05N tris-HCl at pH 8 and 9. Preliminary tests of the antibiotic in mice have been carried out and no toxicity observed with daily doses up to 25 μg.

It has now been found that Myxin is a phenazine derivative having substituents in the 1,5,6 and 10 positions. An outline of the studies leading to this determination is given below. Methods of synthesis of these phenazines have been developed as described below.

The nuclear magnetic resonance (nmr) and ultraviolet (UV) absorption spectra of Myxin show that the phenazine nucleus is intact. The nmr spectrum in deuterochloroform shows a low field signal due to a strongly bonded hydroxyl hydrogen at δ (delta) 14.7 cycles (relative to internal tetramethylsilane), a complex set of signals [at least nine lines in the aromatic hydrogen region (δ 6.9 to 8.3, six hydrogens)], and a three-hydrogen singlet attributable to a methoxyl group at δ 4.07. The empirical formula obtained by elemental analysis is $C_{13}H_{10}N_2O_4$ [calculated carbon C 60.46 percent, hydrogen H 3.90 percent, nitrogen N 10.85 percent, oxygen O 24.78 percent, N.W. 258: found C 60.81, H 3.95, N 9.01, M.W. 268].

On heating Myxin to about 120°–130° C., or on chemically reducing Myxin (e.g. with stannous chloride in methanol) an orange pigment forms which 2for $C_{13}H_{10}N_2O_3$ [calculated C 64.46, H 4.16, N 11.57, O 19.82, M.W. 242: found C 64.90, H 4.08, N 10.96, M.W. 249] and has a melting point of 227°–229° C. The ultraviolet spectrum of the orange pigment is shown in Table I. This spectrum is unchanged in acid, but is displaced toward the red by alkali giving a purple solution. The nmr spectrum shows the presence of a bonded hydroxyl (δ 13.7), six aromatic hydrogens (δ 5.3 to 6.8) and a methoxyl group (δ 4.13). The orange compound absorbs two moles of hydrogen (over a palladium catalyst) to give a colorless product which rapidly oxidizes in air to a yellow compound.

The yellow compound analyzes correctly for $C_{13}H_{10}N_2O_2$ with one methoxyl group; M.P. 190°–191° C; [calculated C 69.01, H 4.46, N 12.38, O 14.14, M.W. 226: found C 68.92, H 4.31, N 11.58, M.W. 226 (mass spectrometry)]. The ultraviolet spectrum of this yellow compound is shown in Table I, with the spectrum being displaced in alkali. The nmr spectrum of this compound shows the

TABLE I

Ultraviolet and Visible Spectra

| Compound | N/10 HCl | | N/10 NaOH | |
|---|---|---|---|---|
| | λ mμ max. | ε | λ mμ max. | ε |
| Myxin | 283 | 9.7×10⁴ | 272 | 8×10⁴ |
| | 340 | 5.4×10³ | 297 | 5.3×10⁴ |
| | 505 | 6.5×10³ | 390 | 5.9×10⁴ |
| | | | 590 | 4.2×10³ |
| Orange | 277 | 9.8×10⁴ | 260 | 3.4×10⁴ |
| | 386 | 2.7×10³ | 295 | 6.1×10⁴ |
| | 478 | 3.5×10³ | 562 | 2.7×10³ |
| Yellow | 272 | 5.6×10⁴ | 260 | 1.8×10₄ |
| | 283 | 5.6×10⁴ | 289 | 4.8×10⁴ |
| | 430 | 7.3×10³ | 362 | 2×10³ |
| | 480 | 1.8×10³ | 380 | 2.1×10³ |
| | 525 | 1.1×10³ | 515 | 2.2×10³ | hydroxyl as a broad signal centered near δ 8.0, six aromatic hydrogens at δ 6.9 to 8.0, and methoxyl group at δ close to 4.11.

Reduction of Myxin (with sodium hydrosulfite) gives the above yellow compound in a somewhat crude state, but identity of the compound from the two sources has been established after purification.

Treatment of the yellow pigment with dimethyl sulfate and alkali converts it to a dimethoxy phenazine M.P. 247°–248° C. This latter compound has been proved to be identical (mixed M.P. and comparison of infrared and other data) with an authentic specimen of 1,6-dimethoxyphenazine. Thus the yellow pigment is 1-hydroxy- 6-methoxyphenazine (I).

It follows that the orange pigment is an oxide of 1-hydroxy-6-methoxyphenazine (I). The location of the extra oxygen on N follows from the reversible alkali shift of the UV spectrum

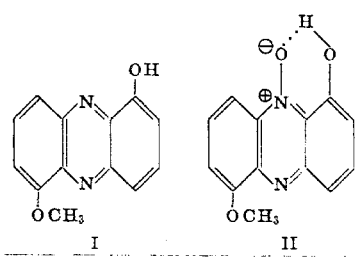

which indicates a free phenolic function. In view of the strong internal hydrogen bonding in this orange pigment (evident from nmr spectrum) and other considerations it is evident that this compound is the 10-oxide (II). This conclusion has been substantiated by oxidation of the yellow compound (I) with m-chloroperbenzoic acid to the orange compound (II).

Simultaneous with the production of the orange pigment in this oxidation Myxin is also produced. Oxidation of the orange compound with the same reagent converts it to Myxin. Since Myxin also shows the reversible alkali shift of UV spectrum the conclusion is that it has either structure (III) or (IV).

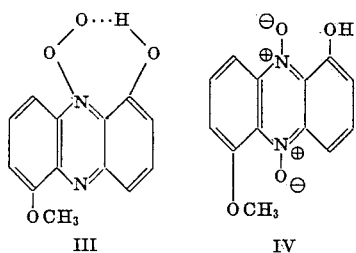

III    IV

Polarographic reduction of Myxin gives three 2-electron waves, one of which is unique while the other two are at very similar potentials to the two waves given by the orange pigment. The structure corresponding to IV would be expected by analogy to the antibiotic iodinin to be deeply colored and to give one 4-electron reduction wave and one 2-electron wave at potentials corresponding to those given by the orange pigment. The rich purple pigment obtained from the *Sorangium* strain in association with Myxin gives the expected polarographic pattern for the 5, 10-dioxide and is iodinin. Of the two possible structures for Myxin (III and IV), X-ray crystallography has shown IV to be correct.

By a series of oxidations and reductions it is possible to interconvert I, II, and IV. Conversion of the yellow pigment I and orange pigment II to Myxin IV is described below in Examples 1 and 2.

The synthesis of the 5,10-dioxide compounds may be achieved by preparing a 1,6-disubstituted phenazine e.g. by the Wohl-Ave condensation reaction, converting this to 1-hydroxy-6-alkoxyphenazine, and subjecting the latter to a controlled oxidation to form the 1-hydroxy-6-alkoxyphenazine-5,10-dioxide.

A preferred sequence is to prepare 1,6-dimethoxyphenazine, convert this to 1-hydroxy-6-methoxyphenazine by controlled partial demethylation, and slowly oxidize the latter to form the 5,10-dioxide. It has been found most advantageous to effect the partial demethylation (or dealkylation) by the action of thiophenoxide anion in dipolar aprotic solvents such as dimethylformamide. The controlled oxidation to the 5,10-dioxide has been conveniently carried out by prolonged treatment with excess m-chloroperbenzoic acid at ambient temperature.

Examples 3 and 2 describe the synthesis of Myxin starting from 1,6-dimethoxyphenazine using this sequence. Variations may be made in this synthesis particularly by starting with other compounds but proceeding through 1-hydroxy-6-substituted phenazines, where the 6-substituent is more bulky when hydroxyl and not readily oxidized (particularly alkoxy, and alkyl).

The following Examples are illustrative of various aspects of the invention.

EXAMPLE 1

One millimole of the orange compound (II), dissolved in 50 cc. of benzene, was mixed with 2 millimoles of m-chloroperbenzoic acid and the mixture left at room temperature for four days (in dark). The remaining m-chloroperbenzoic acid (and benzoic acid) were extracted from the reaction mixture with saturated potassium carbonate solution. The benzene was removed under reduced pressure (room temperature) and the residual solid dissolved in acetone. Chromatography of this solution on cellulose with methanol as the developing solvent and subsequent crystallization gave the red compound 1-hydroxy-6-methoxyphenazine- 5,10-dioxide (IV) in a 60 to 70 percent conversion of II. Comparison of this product with Myxin by biological tests and physical properties proved it to be identical with Myxin obtained from culture fluid.

EXAMPLE 2

A benzene solution of the yellow compound (I) and m-chloroperbenzoic acid in a ratio of 1 mole of I to 2.5 moles of the acid, was left at room temperature for 24 hours. After four hours chromatographic examination showed the presence of two components, a large amount of orange material with a trace of red material having mobilities or $R_f$ values corresponding to those for the orange (II) and red (IV) pigments. After 24 hours paper chromatography showed only a trace of the yellow compound remaining —the red compound having the characteristics of Myxin predominated. Conversions to the red compound IV of about 95 percent were realized. Comparisons of biological tests and physical properties again showed the red compound to be identical with Myxin from culture fluid.

EXAMPLE 3

The compound 1,6-dimethoxyphenazine (prepared by condensation of o-nitroanisole with o-anisidine) was treated to remove the methyl group from one methoxy substituent. (a) Potassium thiophenoxide (prepared from thiophenol and potassium tertiary butoxide) was mixed with a solution of 1,6-dimethoxyphenazine in anhydrous dimethylformamide (13.8 g./l.) in a ratio of 2.6 moles of potassium thiophenoxide per mole of dimethoxyphenazine, and the resulting solution refluxed at 150°—155° C. for 1 hour under a nitrogen atmosphere. The reaction mixture was cooled, diluted with water, the aqueous layer extracted with benzene (to remove unreacted dimethoxyphenazine), the aqueous layer acidified with dilute hydrochloric acid and extracted with diethyl ether. On evaporating the diethyl ether, a minimum yield of 20 percent of 1-hydroxy- 6-methoxyphenazine (I) was obtained. (b) A less preferred alternative method was carried out in which a saturated solution of potassium hydroxide in triethylene glycol was mixed with 25 percent wt. (based on KOH) of dimethoxyphenazine, and the mixture maintained at 170° C. under a nitrogen atmosphere for 2.5 hours. The reaction mixture was cooled, diluted with water and the 1-hydroxy- 6-methoxyphenaxine recovered as in (a) but in low yields.

The product, 1-hydroxy- 6-methoxyphenazine, was compared in terms of spectra and other physical properties with the yellow pigment I derived from Myxin, and these proved to be identical. The combination of the process of this Example with that of Example 2 constitutes a total synthesis of Myxin. Other reagents than those specifically illustrated may be used.

The 1-hydroxy- 5,10-dioxide compounds of the invention may be used in agriculture (e.g. in crude form as fungicides) or as therapeutics in medicine.

EXAMPLE 4

The organism was maintained on Plate Count Agar and inoculum was grown in 50 ml. flasks on yeast-soil extract broth medium containing 0.1 percent glucose at pH 7.5, incubating at 26° C. for 24 hours and inoculating 500 ml. flasks for bulk inoculum. Antibiotic production was carried out in 10 liter fermenters using a medium containing 0.1 percent glucose, 0.1 percent tryptone and dissolved salts. Inocula of 2 percent were used, the temperature was 25° C., the pH 7.5 and airflow 1 liter per min. with stirring rate 300 r.p.m. After 20 hours the antibiotic was harvested by centrifuging off the cells and passing the supernatant (28 liters) over a 7.2×35 cm. bed of Amberlite CG-50 resin in hydrogen form. The bed was washed with distilled water and percolate and wash discarded. The resin was decanted and the pH adjusted to 7.9 with ammonium hydroxide (IN). The resin was filtered off and washed, discarding the filtrate and wash. The pH was adjusted to 9.3 with 1N NH₄OH and the resin repacked in the column and eluted with water at this pH. The eluates are adjusted to pH 1.0 with hydrochloric acid and the antibiotic extracted with a continuous ether extraction. The antibiotic (495 mg.) was recovered from the ether phase by evaporation. This antibiotic (A) material (deep cherry red in color 80 to 90 percent pure) was used for the tests in examples 6 and 7.

EXAMPLE 5

A 10-liter volume of a 12-hour culture from a 10 1. fermenter as in example 4 but using a 10 percent inoculum and an aeration rate of 3 liters of air per minute, was extracted with successive 1 1. volumes of chloroform until the color was removed. The chloroform layer was washed thoroughly with distilled water and then evaporated in vacuo.

The residue was dissolved in acetone and chromatographed on a 7.2P70 cm. column of cellulose powder (Whatman No. 1) packed in methanol and washed therewith. Filter paper discs (7.0 cm. diameter) were dipped several times in the acetone solution and air-dried between dippings. The dry discs (10) were carefully placed in the column under a thin layer of methanol. The column was developed with methanol to elute the Myxin fraction, yielding approximately 100 mg.

EXAMPLE 6

Activity of the antibiotic A material against a penicillin-resistant strain of Staphylococcus aureus (PS 80) was determined by a dilution series assay procedure. The following medium TYD was used: tryptone 0.5 percent; yeast extract 0.25 percent, and dextrose 0.1 percent. To establish whether the action of the antibiotic against S. aureus was bacteriostatic or bactericidal, duplicate 10 ml. colorimeter tubes, each containing 9 ml. of TYD broth, were innoculated with 1 ml. of a 24-hour TYD broth culture of S. aureus. The antibiotic was added to give a final concentration of 5 zg./ml. in each tube. Turbidity measurements (Klett-Summerson colorimeter 660 mμ filter) were made immediately following the mixing of the tube contents (vortex mixer) for 30 seconds and 1 ml. aliquots were removed for serial dilution and plating on Plate Count Agar. Tubes were incubated at 37° C. and similar turbidity measurements and platings were made at 3, 6 and 24 hours after inoculation.

TABLE II

Nature of Action of Myxin

Against *Staphylococcus Aureus*

| Incubation, hours | Turbidity* | | Plate Count** (millions/ml.) | |
|---|---|---|---|---|
| | Antibiotic | Control | Antibiotic | Control |
| 0 | 43 | 40 | 0 | 3.6 |
| 3 | 39 | 71 | 0 | 128.0 |
| 6 | 37 | 99 | 0 | 373.0 |
| 24 | 31 | 127 | 0 | 85.0 |

*Expressed as Klett units (660 mzfilter) average of duplicate tubes.

**Average of triplicate plates.

The data shown in Table II clearly indicate the action of the antibiotic against *S. aureus* to be bactericidal. In the control media numbers of viable cells increased rapidly on incubation, whereas corresponding media containing the antibiotic showed a complete absence of viable cells.

The growth response of the *S. Aureus* strain is shown in Table III the minimum inhibitory concentration being 1.56 zg./ml.

TABLE III

Activity of Myxin Against *Staphylococcus Aureus**

| Antibiotic (μg./ml.) | Time, hours | | | | | |
|---|---|---|---|---|---|---|
| | 5 | 10 | 24 | 30 | 48 | 120 |
| 100.0 | o | o | o | o | o | o |
| 50.0 | o | o | o | o | o | o |
| 25.0 | o | o | o | o | o | o |
| 12.5 | o | o | o | o | o | o |
| 6.25 | o | o | o | o | o | o |
| 3.12 | o | o | o | o | o | o |
| 1.56 | o | o | o | o | o | o |
| 0.78 | o | o | o | + | + | + |
| 0.39 | o | o | o | + | + | + |
| 0.2 | o | o | + | + | + | + |
| 0.1 | o | o | + | + | + | + |
| 0.05 | o | + | + | + | + | + |
| 0.025 | o | + | + | + | + | + |
| 0.012 | + | + | + | + | + | + |
| 0.006 | + | + | + | + | + | + |
| 0.003 | + | + | + | + | + | + |
| 0.0015 | + | + | + | + | + | + |
| 0.0 (inoc.) | + | + | + | + | + | + |
| 0.0 (non-inoc.) | o | o | o | o | o | o |

*
+—growth, medium turbid
o—no growth, medium clear.

EXAMPLE 7

The anitmicrobial spectrum against representative cultures of bacteria, fungi, actinomycetes and yeasts was obtained by the paper disc assay method using Plate Count Agar for the base layer and Penassay Seed Agar (Difco) for the surface layer. An acetone solution of the antibiotic was applied to ¼inch filter paper discs (0.01 ml. per disc) which were dried at room temperature for 30 minutes before plating. Two levels of the partially purified material A, 18 zg. and 3.6 zg. per disc were used for the activity tests. Streptomycin (10 zg.) discs for the bacteria and actinomycetes, and Nystatin (25 zg.) discs for the fungi and yeasts, served as controls. Plates were incubated at 26° C. for 1 —4 days depending on the growth rate of the test organism and inhibition zone diameters were recorded. All bacteria tested (see Table IV) including a number of important plant pathogenic species, gram-positive and gram-negative organisms, were sensitive.

TABLE IV

Activity of Myxin Against Bacteria*

| | 3C Antibiotic | | Streptomycin |
|---|---|---|---|
| | 18 zg. | 3.6 zg. | 10 zg. |
| Plant pathogenic species | | | |
| Agrobacterium tumefaciens | 28 | 16 | 8 |
| Corynebacterium insidiosum | 52 | 48 | 22 |
| C. sepedonicum | 56 | 44 | 24 |
| Erwinia amylovora | 18 | 8 | 16 |
| E. carotovora | 16 | 8 | 14 |
| Pseudomonas atrofaciens | 16 | 12 | 21 |
| P. coronataciens | 21 | 12 | 16 |
| P. phaseolicola | 38 | 35 | 0 |
| P. pisi | 24 | 10 | 26 |
| Xanthomonas campestris | 35 | 27 | 21 |
| X. phaseoli var. fuscans | 30 | 16 | 19 |
| Other species | | | |
| Aerobacter aerogenes | 16 | 10 | 12 |
| Agrebacterium radiobacter | 12 | 0 | 0 |
| Alcaligenes faecalis | 14 | 9 | 11 |
| Arthrobacter globiformis | 34 | 26 | 20 |
| Bacillus alvei | 24 | 22 | |
| B. cereus | 18 | 16 | |

Table IV — Continued

| | | | |
|---|---|---|---|
| B. coagulans | 24 | 24 | |
| B. laterosporus | 28 | 24 | |
| B. pulvifaciens | 24 | 24 | |
| B. sphericus | 22 | 18 | |
| B. subtilis | 24 | 20 | |
| Escherichia coli | 19 | 11 | 15 |
| Micrococcus denitrificans | 34 | 26 | 11 |
| Mycobacterium tuberculosis | 42 | 24 | |
| M. phlei | 56 | 50 | |
| Pseudomonas fluorescens | 12 | 0 | 0 |
| P. stutzeri | 20 | 14 | 17 |
| Rhizobium leguminosarum | 30 | 14 | |
| R. lupini | 16 | 16 | |
| R. meliloti | 46 | 30 | 0 |
| R. phaseoli | 36 | 14 | |
| R. trifolii | 32 | 32 | |
| Staphylococcus aureus | 20 | 18 | 14 |

*Inhibition zone diameter, mm.

Several of these sensitive bacteria were unaffected by the level of streptomycin used as control.

The majority of test fungi (see Table V) also were sensitive to the antibiotic: only three isolates out of a total of 51 cultures being unaffected by the highest concentration (18 μg. per disc) employed. On the other hand

TABLE V

Activity of Myxin Against Fungi*

| | 3C Antibiotic | | Nystatin |
|---|---|---|---|
| Test Organism | 18 μg. | 3.6 μg. | 25 μg. |
| Absidia sp. | 16 | 10 | 12 |
| Acrospeira levis | 30 | 18 | 20 |
| Alternaria sp. | 22 | 12 | 32 |
| Aspergillus Niger | 12 | 0 | 22 |
| Bisporomyces chlamydosporus | 32 | 18 | 26 |
| Botrytis cinerea | 40 | 20 | 38 |
| Byssochlamys nivea | 30 | 12 | 30 sp. |
| Cephalosporium sp. | 0 | 0 | 16 |
| Chaetomium sp. | 30 | 10 | 0 |
| Chrysosporium pannorum | 0 | 0 | 10 |
| Circinella sp. | 20 | 10 | 16 |
| Cladosporium herbarum | 12 | 0 | 26 |
| Corynespora cassiicola | 16 | 0 | 28 |
| Coryneum umbonatum | 26 | 22 | 10 |
| Curvularia lunata | 24 | 8 | 30 |
| Cylindrocarpon radicicola | 16 | 8 | 18 |
| Cylindrocladium scoparium | 16 | 0 | 18 |
| Emericellopsis minima | 22 | 8 | 30 |
| Fusarium culmorum | 20 | 10 | 14 |
| F. oxysporum | 14 | 8 | 10 |
| F. oxysporum f. lini | 24 | 12 | 14 |
| F. oxysporum f. lycopersici | 20 | 8 | 12 |
| F. solani | 16 | 0 | 10 |
| Gliocladium roseum | 24 | 12 | 18 |
| Gonytrichum macrocladum | 20 | 10 | 18 |
| Helminthosporium sativum | 24 | 10 | 28 |
| Humicola sp. | 22 | 0 | 18 |
| Leptographium sp. | 20 | 8 | 26 |
| Menispora ciliata | 26 | 14 | 18 |
| Monilia sitophila | 12 | 0 | 28 |
| Mortierella sp. | 40 | 24 | 0 |
| Mucor ramannianus | 22 | 10 | 22 |
| Myrothecium sp. | 14 | 8 | 18 |
| Nigrospora sp. | 18 | 0 | 22 |
| Oidiodendron sp. | 32 | 0 | 18 |
| Paecilomyces marquandil | 16 | 0 | 8 |
| Papularia sphaerosperma | 34 | 16 | 26 |
| Pencillium sacculum | 30 | 14 | 40 |
| Periconia macrospinosa | 28 | 16 | 36 |
| Pullularia pullulans | 12 | 0 | 32 |
| Rhinocladiella sp. | 0 | 0 | 12 |
| Rhizopus nigricans | 16 | 10 | 14 |
| Scolecobasidium constrictum | 36 | 16 | 20 |
| Stachybotrys atra | 22 | 12 | 14 |
| S. Aurantia | 20 | 10 | 16 |
| Mortierella Stilbum sp. | 20 | 0 | 14 |
| Stysanus μg./disc, | 26 | Myxin. | 16 |
| Trichoderma veride | 16 | 0 | 14 |
| Trichothecium roseum | 26 | 0 | 0 |
| Verticillium albo-atrum | 34 | 18 | 32 |
| Zygorhynchus sp. | 22 | 12 | 14 |

*Inhibition zone diameter, mm.

the three cultures Chaetomium sp., Martierella sp., and Trichothecium roseum that proved to be insensitive to the antifungal antibiotic Nystatin, at a level of 25 μg./disc, were strongly inhibited by the antibiotic Myxin.

Various Streptomyces sp. and yeasts similarly proved to be highly sensitive to the antibiotic (see Table VI).

TABLE VI

Activity of Myxin Against Actinomycetes and Yeasts*

| | 3C Antibiotic | | Streptomycin | Nystatin |
|---|---|---|---|---|
| Test Organism | 18 μg. | 3.6 μg. | 10 μg. | 25 μg. |
| Actinomycetes | | | | |
| Streptomyces | | | | |
| candidus | 38 | 23 | 26 | |
| S. griseus | 20 | 10 | 0 | |
| S. lavendulae | 41 | 32 | 16 | |
| S. scabies | 46 | 22 | 28 | |
| S. sp. (1-22) | 26 | 20 | 16 | |
| S. sp. (1-31) | 40 | 34 | 22 | |
| S. sp. (1-40) | 36 | 28 | 22 | |
| S. sp. (1-45) | 30 | 22 | 16 | |
| S. sp. (1-71) | 34 | 24 | 16 | |
| S. sp (1-75) | 26 | 18 | 14 | |
| S. sp. (2-1) | 38 | 30 | 20 | |
| Yeasts | | | | |
| Candida krusei | 16 | 8 | | 14 |
| C. utilis | 16 | 8 | | 14 |
| C. sp. | 18 | 10 | | 22 |
| Endomycopsis vernalis | 14 | 8 | | 14 |
| Rhodotorula mucilaginosa | 12 | 0 | | 22 |
| Saccharomyces cerevisiae | 20 | 10 | | 20 |
| S. fragilis | 10 | 0 | | 18 |
| S. logos | 14 | 8 | | 16 |
| Schizosaccharomyces pombe | 28 | 14 | | 32 |
| Zygosaccharomyces acidifaciens | 16 | 0 | | 32 |
| Z. ravennatis | 10 | 0 | | 32 |
| Z. rugosus | 26 | 12 | | 32 |

Inhibition zone diameter, mm.

EXAMPLE 8

The effect of 1-hydroxy- 6-methoxyphenazine- 5,10-dioxide (Myxin) on various infected crop seeds has been investigated.

Tests with barley have shown that treatment by soaking seed in a 50 μg./ml. water solution of the antibiotic completely eliminated surface contamination by bacteria, fungi and yeasts normally causing storage decay, and had no adverse effect on seed germination. The seed of barley, wheat, oats, flax and alfalfa germinated normally and showed no visible evidence of shoot abnormality, after soaking for 4 hours in 50 μg./ml. water solution of Myxin. Furthermore daily application of a similar solution to the foliage of soybean and wheat seedlings for a period of 5 days caused no visible signs of injury to the plants.

In addition seeds of several crops have been tested after treatment at a level of 500 μg./ml. in a 10 percent DMSO-in-water solution. Germination of wheat, winter rye and alfalfa seed appeared normal after 24 hours soaking in this solution, and the resulting seedlings showed no evidence of root or shoot injury. Myxin at this concentration completely disinfects seeds bearing many contaminating micro-organisms.

The crude fermentation product including Myxin and minor amounts of the purple pigment (iodinin) and/or the orange pigment may be used effectively for agricultural application.

What is claimed is:
1. 1-hydroxy- 6-methoxyphenazine.
2. 1-hydroxy- 6-methoxyphenazine- 10-oxide.
3. 1-hydroxy- 6-methoxyphenazine- 5,10-dioxide.
4. A 1-hydroxy- 6-methoxyphenazine- 5,10-dioxide relatively unpurified antibiotic composition consisting essentially of Myxin and a minor amount of iodinin.